United States Patent [19]
Groves

[11] Patent Number: 5,605,964
[45] Date of Patent: Feb. 25, 1997

[54] ACRYLATE-CONTAINING POLYMER BLENDS AND METHODS OF USING

[75] Inventor: James D. Groves, Hudson, Wis.

[73] Assignee: Minnesota Mining and Manufacturing Company, St. Paul, Minn.

[21] Appl. No.: 493,801

[22] Filed: Jun. 22, 1995

[51] Int. Cl.$^6$ ............................ C08L 53/02; C08L 33/04; C08L 33/26

[52] U.S. Cl. ............................ 525/93; 525/74; 525/78; 525/80; 525/79; 525/77; 525/221; 525/222; 525/230

[58] Field of Search .................. 525/73, 74, 93, 525/96, 98, 77, 78, 79; 427/412.3

[56] References Cited

U.S. PATENT DOCUMENTS

| | | | |
|---|---|---|---|
| 3,832,274 | 8/1974 | Owston | 428/462 |
| 4,126,504 | 11/1978 | Wolinski et al. | 156/310 |
| 4,243,500 | 1/1981 | Glennon | 204/159 |
| 4,552,921 | 11/1985 | Shyu et al. | 525/96 |
| 4,726,982 | 2/1988 | Traynor et al. | 428/213 |
| 4,994,508 | 2/1991 | Shiraki et al. | 525/74 |
| 5,143,972 | 9/1992 | Groves | 525/71 |
| 5,232,838 | 8/1993 | Nelson et al. | 435/30 |
| 5,234,524 | 8/1993 | Ozu et al. | 156/327 |
| 5,281,663 | 1/1994 | Gelles et al. | 525/64 |

FOREIGN PATENT DOCUMENTS

| | | |
|---|---|---|
| 0044166 | 1/1982 | European Pat. Off. . |
| 0238863 | 9/1987 | European Pat. Off. . |
| 2053238 | 2/1981 | United Kingdom . |

*Primary Examiner*—Mark Warzel
*Attorney, Agent, or Firm*—Gary L. Griswold; Walter N. Kirn; Doreen S. L. Gwin

[57] ABSTRACT

A polymer blend comprising (a) a block copolymer comprising (i) a polystyrene block and (ii) a polydiene block or a hydrogenated polydiene block, said block copolymer (a) being non-maleated; and (b) a polymer comprising a polymerization reaction product of two or more monoethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer and, optionally, (iii) from 1–10 parts, based upon 100 parts of polymer, of a monomer having at least one of carboxylic acid functionality, hydroxy functionality, and epoxy functionality as well as a method of priming a substrate comprising applying the blend to the substrate.

27 Claims, No Drawings

019
ACRYLATE-CONTAINING POLYMER BLENDS AND METHODS OF USING

BACKGROUND OF THE INVENTION

1. Field of the Invention

This invention relates to polymer blends useful, e.g., as adhesives, primers, inks, and paints.

2. Description of the Background Art

Low surface energy substrates such as polyethylene, polypropylene, and other polyolefins are characterized as having critical surface tensions of wetting of about 35 dynes/cm or less. Such surfaces are generally unreceptive to inks, paints, and adhesives due to their poor wettability. There is a need to improve adhesion to such surfaces, as well as to high energy surfaces.

SUMMARY OF THE INVENTION

In a first aspect, the invention features a method of priming a substrate comprising applying to the substrate a blend comprising (a) a block copolymer comprising (i) a polystyrene block and (ii) a polydiene block or a hydrogenated polydiene block, said block copolymer (a) being non-maleated; and (b) a polymer comprising a polymerization reaction product of two or more mono-ethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer.

In a second aspect, the invention features a polymer blend comprising (a) a block copolymer comprising (i) a polystyrene block and (ii) a polydiene block or a hydrogenated polydiene block, said block copolymer (a) being non-maleated; and (b) a polymer consisting essentially of a polymerization reaction product of (i) at least one monoethylenically unsaturated acrylic or methacrylic acid ester of a non-tertiary alcohol having 1 to 14 carbon atoms, inclusive; (ii) at least one monoethylenically unsaturated nitrogen-containing monomer; and (iii) from 1 to 10 parts by weight, based upon 100 parts of polymer, of a monomer having at least one of carboxylic acid functionality, hydroxy functionality, and epoxy functionality.

The invention further features a method of preparing the above-described polymer blends by physically blending block copolymer (a) and polymer (b) together.

The invention provides polymer blends that exhibit good adhesion to both low energy surfaces (e.g., polyolefins such as polyethylene and polypropylene), as well as higher energy surfaces (i.e., having surface energies greater than 35 dynes/cm such as metal and glass). The blends are useful as primers (e.g., before applying paints, adhesives, and coatings) as well as adhesives (e.g., for use as tie layers and pressure sensitive adhesive), inks, and paints. The blends can serve more than one function, e.g., the blend can be a primer and a paint or a primer and an adhesive.

DETAILED DESCRIPTION OF THE INVENTION

The invention features blends having a block copolymer (a) and an acrylate or methacrylate ester-containing polymer (b) as set forth in the Summary of the Invention section.

The block copolymer (a) comprises one or more polystyrene blocks and one or more polydiene or hydrogenated polydiene blocks. If one or two polystyrene blocks and one polydiene or hydrogenated polydiene block are present, the block copolymer can be designated as an AB block copolymer (containing one polystyrene block and one polydiene or hydrogenated polydiene block) or an ABA block copolymer (containing two polystyrene blocks and one polydiene or hydrogenated polydiene block), "A" designating polystyrene and "B" designating polydiene or hydrogenated polydiene.

Examples of a polydiene block or hydrogenated polydiene block include, e.g., polybutadiene, polyisoprene, ethylene/butylene, or ethylene/propylene block. The term "polydiene" refers to repeating units of a diene monomer. The hydrogenated polydiene block preferably has a residual unsaturation of less than 10%, more preferably less than 5%, based on the original amount of ethylenic unsaturation of the polydiene block. At least one of the blocks of block copolymer (a) preferably is a butadiene, isoprene, ethylene/butylene, or ethylene/propylene block. A particularly preferred block copolymer (a) is a styrene-ethylene/butylene-styrene block copolymer.

Examples of suitable block copolymers include styrene-butadiene-styrene, styrene-isoprene-styrene (e.g., commercially available from Shell Chemical Company, Houston, Tex., under the trade designation "Kraton D-1107"), styrene-ethylene/butylene-styrene (e.g., commercially available from Shell Chemical Company, Houston, Tex., under the trade designation "Kraton G-1657"), styrene-ethylene/butylene-styrene, and styrene-butadiene (e.g., commercially available from Fina Chemical Company, Dallas, Tex., under the trade designations "Finaprene 1205" and "Finaprene 411P"). For illustration, "Kraton G-1657" has a tensile strength of 3400 psi, (23.45 MPa), a percent elongation of about 750, a Shore A hardness of about 65, a specific gravity of about 0.90, a Brookfield viscosity (20% weight in toluene) of about 1100 cps at 77° F. (25° C.), and a styrene to rubber weight ratio of 14 to 86.

Block copolymer (a) preferably has a ratio, by weight, of polystyrene block to polydiene block or hydrogenated polydiene block which ranges from about 5:95 to 95:5; more preferably 10:90 to 50:50.

Block copolymer (a) is not maleated. The term "maleated" as used herein means modified to contain an average of one or more carboxyl groups.

Polymer (b) comprises a polymerization reaction product of two or more mono-ethylenically unsaturated monomers in which (i) at least one of the monomers is an acrylic or methacrylic acid ester of a non-tertiary alcohol having 1 to 14 carbon atoms, inclusive, and (ii) at least one of the monomers is a nitrogen-containing monomer.

In addition, polymer (b) may further comprise component (iii), i.e., a monomer having at least one of carboxylic acid functionality, hydroxy functionality, and epoxy functionality or combinations of these monomers. Examples of monomer (iii) includes acrylic acid, methacrylic acid, itaconic acid, 2-hydroxyethyl acrylate, 2-hydroxyethyl methacrylate, glycidyl acrylate, and glycidyl methacrylate. Acrylic and methacrylic acid are preferred. The amount of component (iii), when present, is preferably 1 to 10 parts by weight, more preferably 1 to 5 parts by weight, based on 100 parts by weight of polymer (b). In any case, polymer (b) comprising components (i) and (ii), or (i), (ii), and (iii) is not crosslinked.

The non-tertiary alcohol preferably includes methanol, ethanol, 1-propanol, 2-propanol, 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl- 1-pentanol, 2-ethyl-1-butanol, 3,5,5-trimethyl-1-hexanol, 3-heptanol, 2-octanol, 1-decanol, or 1-dodecanol. A particularly preferred ester monomer is iso-octyl acrylate.

The nitrogen-containing monomer may comprise an N-vinyllactam (e.g., N-vinylpyrrolidone or N-vinylcaprolactam), acrylamide, an N-alkylacrylamide (e.g., N-methylacrylamide), or N,N-dialkylacrylamide (e.g., N,N-dimethylacrylamide) or combinations thereof. The amount of nitrogen-containing monomer depends on the monomer selected. Typically, the amount of nitrogen-containing monomer is at least 2 parts by weight, preferably 5 parts to 40 parts by weight, based on the weight of polymer (b). For example, 5 to 30 parts by weight is preferred when N-vinyllactams and N,N-dimethylacrylamides are used individually. In addition, at least 5 parts by weight of acrylamide is typical when used alone; however, if N-vinyllactam and acrylamide are used together, the amount of acrylamide used can be less than 5 parts by weight, for example, 1 to 4 parts by weight.

The nitrogen-containing monomer of the present invention does not contain acrylic and methacrylic acid ester groups, as in the case of N-vinyllactams, but may contain acrylic or methacrylic acid or derivatives thereof, as in the case of acrylamide, N-alkylacrylamide, or N,N-dialkylacrylamide.

It is believed that the nitrogen-containing monomer enhances the compatibility of the blend through association with the phenyl groups of the styrene blocks, resulting in improved properties.

In a preferred embodiment, the homopolymer of the acrylic or methacrylic acid ester has a Tg less than 20° C. A polymeric moiety having a Tg greater than 20° C., a weight average molecular weight above 2,000, and capable of associating with one or more of the blocks of the block copolymer (e.g., a polystyryl moiety as described in Groves, U.S. Pat. No. 5,143,972 entitled "Pressure-Sensitive Adhesive Composition" which is hereby incorporated by reference) may be polymerized with the acrylic or methacrylic acid ester portions of polymer (b). In this case, further association is believed to occur between this polymeric moiety and the phenyl groups of the styrene blocks.

Polymer (b) is preferably prepared by free radical-initiated photopolymerization or thermal polymerization of the base monomers using conventional polymerization techniques and is then physically blended with block copolymer (a).

Block copolymer (a) is present in an amount sufficient to allow association with the substrate, particularly if the substrate is a low energy substrate. Polymer (b) is present in an amount sufficient to associate with block copolymer (a). The term "association" or "associate" as used herein with respect to the interaction between a substrate and block copolymer (a) refers to the bonding or contact between the substrate and block copolymer (a) such that the substrate, particularly a low energy substrate, is made more receptive to materials such as inks; paints; and adhesives. The term "association" or "associate" as used herein with respect to polymer (b) and block copolymer (a) refers to the bonding or contact between polymer (b) and block copolymer (a) such that each interacts with the other. The ratio, by weight, of block copolymer (a) to polymer (b) preferably ranges from about 95:5 to about 5:95, more preferably from about 75:25 to about 25:75.

Examples of preferred blends include: (1) a blend of styrene-ethylene/butylene-styrene block copolymer and iso-octyl acrylate/N-vinylcaprolactam/acrylic acid polymer; (2) a blend of styrene-ethylene/butylene-styrene block copolymer and iso-octyl acrylate/N-vinylcaprolactam polymer; (3) a blend of styrene-ethylene/butylene-styrene block copolymer and iso-octyl acrylate/N-vinylpyrrolidone/acrylic acid/ acrylamide/polystyrene macromer polymer; (4) a blend of styrene-ethylene/butylene-styrene block copolymer and iso-octyl acrylate/acrylamide polymer; and (5) a blend of styrene-ethylene/butylene-styrene block copolymer and iso-octyl acrylate/N,N-dimethylacrylamide polymer. The blend may be provided in the form of a primer and/or a paint, ink, or adhesive (e.g., a pressure sensitive adhesive) by using additives, for example, as described below.

As a primer, the polymer blend is particularly useful in the case of low energy substrates. As used herein, "low energy substrate" refers to a substrate having a critical surface tension of wetting no greater than about 35 dynes/cm. Examples include polyolefin polymers such as polyethylene and polypropylene.

The blends can be tackified by incorporating a tackifying agent, modifying the structure of the acrylate or methacrylate ester-containing polymer, or through a combination of both. Tackifiers suitable for tackifying the blends include low molecular weight hydrocarbon resins, and α- and β-pinene-based resins. Many tackifiers are commercially available, and optimum selection thereof can be accomplished by one of ordinary skill in the adhesive compounding art. Representative examples of commercially available tackifiers suitable for the blends include the resins available under the trade designations "Regalrez 1018," "Regalrez 1078," and "REZ-D 2084," all of which are available from Hercules Inc., Wilmington, Del.; "Escorez-143H" and "Escorez 5380," both of which are available from Exxon Corp., Houston, Tex.; and "Wingtack Plus," available from Goodyear Tire and Rubber Co, Akron, Ohio. The amount of tackifier included in the blend preferably ranges from about 20 to about 250 parts per hundred parts of the blend. In general lower concentrations of tackifier are used where the blend is in the form of a primer, whereas higher concentrations are used where the blend is in the form of a pressure sensitive adhesive.

The blends may include an anti-oxidant to inhibit oxidation and consequent loss of tackiness as the blends age. Suitable anti-oxidants are based on either (1) a hindered phenol or (2) a sulfur-containing organo-metal salt. Examples of hindered phenols include ortho-substituted or 2,5-disubstituted phenols, where the substituent group(s) is/are a branched hydrocarbon radical having 2 to 30 carbon atoms, e.g., tertiary butyl or tertiary amyl radicals, and para-substituted phenols, where the substituent groups are OR1, where R1 is methyl, ethyl, 3-substituted propionic ester, etc. Examples of commercially available hindered phenols include those available from Ciba-Geigy Corp., Hawthorne, N.Y., under the trade designation "Irganox 1076" and those available from American Cyanamid Co, Wayne, N.J., under the trade designation "Cyanox LTDP." Suitable sulfur-containing organo-metal salts are the nickel derivatives of dibutyl dithiocarbamate.

The blends may further include inorganic fillers such as calcium carbonate, clay, talc, silica, and limited amounts of carbon black, as well as organic fillers such as wood flour and starch. Calcium carbonates, clays, and talcs are most commonly used. The blends can also be colored by including dry pigments or color concentrates (usually polystyrene based); coloring is often desired where the blends are in the form of paints or inks. Typical pigments include titanium dioxide and carbon black. Stabilizers such as fungicides and mildewicides can be included as well.

Other additives which may be included in the blends are silanes, titanates, and chlorinated polyolefins ("CPOs").

Furthermore resins such as epoxy resins, may be blended with the polymer blend comprising block copolymer (a) and polymer (b).

The resistance to ultraviolet light degradation of the blends can be enhanced by incorporating ultraviolet inhibitors into the blends. Typically, a 1 part per hundred (phr) loading of the ultraviolet inhibitor having the trade designation "Cyasorb IV 531" (available from American Cyanamid Company, Wayne, N.J.) or a mixture of equal parts of ultraviolet inhibitors having the trade designations "Tinuvin 328" (available from Ciba-Geigy Corp., Hawthorne, N.Y.) and "Uvinal 400" (GAF Corp., New York, N.Y.) is sufficient to provide this enhancement. Enhanced results may be achieved from a combination of 0.5 phr of one of the three above-mentioned ultraviolet inhibitors with a nickel chelate having one of the following trade designations: "Cyasorb UV 1084" (0.5 phr) (available from American Cyanamid Company, Wayne, N.J.) or "NBC" (0.1 phr) (available from E.I. du Pont de Nemours and Company, Wilmington, Del.). As used herein, phr is based on the weight of block copolymer in the blend unless otherwise noted.

The above-described blends are particularly useful as primers for adhesives, e.g., pressure sensitive adhesives, thermosetting adhesives, thermoplastic adhesives, and hybrid adhesives. The term "hybrid adhesives" as used herein refers to combinations of two or more different types of adhesives as well as two or more polymers suitable for forming adhesives.

Thermosetting adhesives are generally formed by addition polymerization. Examples of thermosetting adhesives include polysulfides, silicones, polyesters, polyurethanes; epoxies, anaerobic and aerobic acrylics, radiation curable polymers, and vulcanizing rubbers. Thermosetting adhesives typically cure by heat, catalysts, or light or moisture activation. After curing, thermosetting adhesives are generally insoluble, i.e., the adhesive will not dissolved in an organic solvent or water and infusible, i.e., the adhesive will not flow when heated.

Pressure sensitive adhesives generally do not undergo a progressive increase in viscosity after preparation, rather they are permanently in a tacky stage. Examples of pressure sensitive adhesive include those derived from polyacrylates, block copolymers as defined herein, and natural or synthetic rubber. Pressure sensitive adhesives typically possess viscoelastic properties and thus exhibit characteristics of both a viscous liquid and an elastic solid.

Thermoplastic adhesives are soluble and fusible materials. Examples of thermoplastic adhesives include vinyl adhesives, e.g., polyvinyl chloride, polyvinyl butyral, polyvinyl alkyl esters and ethers, and vinyl-acetate-ethylene copolymer adhesives; acrylic adhesives; hot melt adhesives; cellulosic adhesives; and asphalt adhesives. Thermoplastic adhesives may be in the form of emulsions, solutions, or solids.

A primer of the present invention may be applied using a variety of techniques including dipping, spraying, brushing, rotogravure, Meier rod, and knife coating. One particularly useful application technique involves applying a primer of the present invention to the substrate and then abrading. This technique effects chemical reactions induced by mechanical actions like abrading, i.e., mechano-chemistry. Suitable abrasive products include a lint-free tissue, cloth, or sandpaper. When sandpaper is used, it is preferably wet or dry and 50% of the abrasive grit size preferably ranges from 100 to 2 microns. When pressure sensitive adhesives are being bonded to a substrate, preferably the abrasive grit size ranges from 8 to 2 microns, most preferably from 5.5 to 2.0 microns. When structural adhesives, i.e., epoxies and polyurethanes, are being bonded to a substrate, preferably the abrasive grit size ranges from 100 to 50 microns.

The following non-limiting examples further illustrate the present invention.

EXAMPLES

TEST METHODS

FPL Process For Etching Aluminum

Aluminum specimens (typically 152.4 mm×50.8 mm×1.6 mm) (commercially available from Vincent Metals, Minneapolis, Minn. under the trade designation "2024-T3 Alclad") are treated according to the etching process described in H. W. Eichner, Forest Products Laboratory; Report No. 1842, Apr. 1, 1954, Madison, Wis., USA. Specifically, the specimens are treated as follows. Each specimen is rinsed in acetone and then allowed to air dry. Next, each specimen is degreased by soaking for 10 minutes in 75 g of Oakite 164 (alkaline detergent) (commercially available from Oaktite Products, Inc., Berkeley Heights, N.J.) per liter of distilled water. Each specimen is then rinsed for 2 minutes in tap water, followed by immersion for 10 minutes at 71° C. in an etching bath consisting of 1161 g of $H_2SO_4$, 156.8 g of $Na_2Cr_2O_7 \cdot 2H_2O$, 1.5 g of 2024-T3 bare aluminum alloy chips, and enough distilled water to make 3.5 liters of solution. Following immersion in the etching solution, each specimen is rinsed for 2 minutes with tap water and dried for 10 minutes at 66° C.

Static Shear

The shear strength of primed and unprimed substrates bonded to double-coated, pressure sensitive adhesive foam tapes or pressure sensitive transfer adhesives is determined according to the following procedure.

An FPL-etched aluminum strip (commercially available from Vincent Metals, Minneapolis, Minn. under the trade designation "2024-T3 Alclad") measuring 50.8 mm×25.4 mm×1.6 mm with a 7 mm diameter hole on center and 10 mm from one edge of the strip is prepared from the specimen described above. Likewise, similar strips of the primed and unprimed substrate, each having a thickness that does not yield at the test temperature under the testing load, are prepared.

A 12.7 mm wide pressure sensitive adhesive tape carried on a release liner is adhered to the solid end of the aluminum strip (i.e., the end opposite the end with the hole) and trimmed to a length of 25.4 mm. The liner is then removed and the solid end of the substrate strip adhered to the exposed adhesive surface. The resulting specimen is placed in a horizontal position and rolled down with a 2.4 kg roller to insure intimate contact between the surfaces. After dwelling at room temperature for 24 hours the specimen is placed in an air circulating oven preheated to 80° C. After 15 minutes, a 1 kg weight is hung from the specimen. The specimen is tilted 2° from the vertical in order to negate any peel forces. The time it takes for the weight to fall (in minutes) is the "static shear value". If no failure occurs after 6,000 minutes, the test is discontinued.

90° Peel Adhesion—Pressure Sensitive Adhesive

Peel adhesions (N/100 mm) of double-coated pressure sensitive foam tapes to various primed and unprimed substrates are determined in the following manner.

The matted side of a 114 mm×15.9 mm×0.13 mm piece of aluminum foil (commercially available from Lawrence Fredrick Company, Greenwood, Ill., under the trade designation "1145-0-SB") is placed on the linerless side of a foam tape sample carried on a release liner measuring 101.6 mm×12.5 mm×1.1 mm. A 2.4 kg hard-rubber-covered steel roller is then passed back and forth three times over the specimen.

Next, about 50 mm of the liner is cut from the linered side of the sample, and the sample is then placed and centered near one end of a 152.4 mm×50.8 mm×5.1 mm plaque of the primed or unprimed substrate. A 2.4 kg hard-rubber-covered roller is again passed back and forth three times over the assembled specimen. The procedure is then repeated to laminate a second foam tape-aluminum construction to the other end of the plaque.

After dwelling for the specified length of time at ambient temperature, the specimen is placed in a 90° peel fixture (commercially available from Consultants INTL., Network, Mentor, Ohio, under the trade designation "PJ-90") and mounted in an Instron tensile tester (available from Instron Corp., Canton, Mass.). The 90° peel adhesion is measured by removing the free end of the aluminum foil-laminated foam tape at a rate of 30.5 cm per minute. The reported peel strengths (in N/100 mm) are an average of three determinations except where noted.

Cohesive Strength

Cohesive strengths of foam tapes were determined according to the procedure of the 90° peel adhesive test, except that the tapes were bonded to a 152.4 mm×50.8 mm×1.6 mm, FPL-etched aluminum panel (available from Vincent Metals, Minneapolis, Minn., under the trade designation "2024-T3") and allowed to dwell for 2 hours prior to testing. The foam tapes used were commercially available from Minnesota Mining and Manufacturing Company, St. Paul, Minn., under the trade designation "Scotch Brand" in conjunction with the designations "Y-4220", "VHB-4205", and "VHB-4950" (double coated with acrylic pressure sensitive adhesives); "VHB-4952" (double-coated with a styrene-butadiene rubber (SBR) pressure sensitive adhesive); and "VHB-4910" (1 mm thick acrylic transfer tape). All foam tapes failed by cohesive failure of the foam core. The results shown in Table A are an average of three values for each tape. These values are used as benchmarks for the semi-quantitative peel adhesion test described below.

TABLE A

| Tape | Adhesive Type | Cohesive Failure (N/100 mm) |
| --- | --- | --- |
| "Y-4220" | acrylic | 438 |
| "VHB-4205" | acrylic | 1050 |
| "VHB-4952" | SBR | 658 |
| "VHB-4910" | acrylic | 702 |
| "VHB-4950" | acrylic | 877 |

Semi-Quantitative Peel Adhesion

The level of adhesion of primed and unprimed substrates to pressure sensitive adhesives which cannot be determined quantitatively (e.g., where the substrate is a thin and/or flexible film or a predimensioned rigid article) are determined semi-quantitatively. Sample preparation is carried out according to the 90° peel adhesion procedure except that two or more foam tapes are used and the tape-aluminum foil laminate is secured to the substrate with hand pressure or a 2.4 kg rubber-covered-steel roller. After dwelling for a specified time (typically 15 minutes), the free end of the tape-aluminum foil laminate is pulled from the substrate by hand. If cohesive failure of the foam core is not observed, a foam tape having the next lowest cohesive strength (determined with reference to Table A, above) is bonded and then removed. This procedure is repeated with successive foam tapes (with reference to Table A, above) until cohesive failure of the foam core occurs. A semi-quantitative level of adhesion of the primed substrate to the pressure sensitive adhesive of the foam tape is then determined with reference to Table A.

Single Overlap Shear

Two substrate plaques, each measuring 51 mm×25.4 mm×5 mm, are cleaned twice with a heptane-saturated soft tissue and then rinsed with ethanol. After 15 minutes, the primer solution is applied to one side of each of the plaques using a cotton-tipped applicator and allowed to dry for 30 minutes. Two drops of ethyl cyanoacrylate adhesive (commercially available from Minnesota Mining and Manufacturing Company, St. Paul, Minn., under the trade designation "Pronto CA-40") are then placed on one of the primed surfaces. Next, the remaining primed substrate plaque is placed on top of the cyanaoacrylate-containing plaque to form a 12.7 mm overlap joint. Finger-tight pressure is maintained over the joint for about 0.5 minutes. Three test assemblies are prepared for each measurement and allowed to cure for 72 hours prior to testing. Joint strength is measured in an Instron tensile tester (available from Instron Corp., Canton, Mass.) at a crosshead speed of 1.47 mm/min.

90° Peel Adhesion—Thermosetting Adhesive

Peel adhesions (N/100 mm) of films of polypropylene (PP) and low density polyethylene (LDPE) bonded with thermosetting adhesives are determined in the following manner.

A film sample, 175 mm×75 mm×0.25 mm, was secured to a flat surface using a 0.25 mm acrylic pressure sensitive transfer adhesive (available from Minnesota Mining and Manufacturing Company, St. Paul, Minn. under the trade designation "F9473PC"). The surface of the sample was flooded with a primer solution and evenly abraded with a piece of 80 micron grit, fabric backed abrasive (available from Minnesota Mining and Manufacturing Company, St. Paul, Minn. under the trade designation "3M-ITE P220"). After one minute, the surface was flooded again with primer solution and abraded for an additional one minute. The film sample was washed three times each with xylene and ethanol and dried under ambient conditions for 24 hours. A 0.5 mm layer of a two-part epoxy adhesive (available from Minnesota Mining and Manufacturing Company, St. Paul, Minn. under the trade designation "Scotch-Weld 2216 B/A") was applied to a 152.4 m×101.6 mm×1.6 mm FPL-etched 2024-T3aluminum panel. The primed side of the film was bonded to the adhesive using pressure from a light rubber-covered roller. After 72 hours, the film was slit into three 12.5 mm test specimens. The aluminum panel was placed in a 90° peel fixture (available from Consultant INTL Network, Mentor, Ohio) and mounted in an Instron tensile tester (available from Instron Corp., Canton, Mass.). The 90° peel adhesion was measured by removing the free end of the film strips at a rate of 30.5 cm per minute. A control sample was prepared in the same manner except the sample was not flooded with primer solution and the sample was abraded in the absence of a primer solution. The reported peel strengths (N/100 mm) are an average of three determinations.

EXAMPLE 1

This example illustrates one preferred blend according to the invention useful as a primer.

Preparation of Block Copolymer Solution

A 25% solution of block copolymer was prepared by dissolving 25.0 g of styrene-ethylene/butylene-styrene tri-block copolymer (commercially available from Shell Chemical Company, Houston, Tex., under the trade designation "Kraton G-1657") and 0.25 g of antioxidant (available from Ciba-Geigy Corp., Hawthorne, N.Y., under the trade designation "Irganox 1076") in 75.0 g of a solvent mixture of cyclohexane, xylene, and ethanol in a weight ratio of 5.5:3.5:1.0.

Preparation of Acrylate Ester Polymer

A terpolymer consisting of iso-octyl acrylate/N-vinylcaprolactam/acrylic acid (IOA/NVC/AA) (78/20/2) was prepared as follows.

39 g of IOA, 10 g of NVC, 1 g of AA, 0.1 g azobisisobutyronitrile (commercially available from E.I. du Pont de Nemours & Company, Wilmington, Del., under the trade designation "VAZO-64"), 52.5 g of ethyl acetate, 9.0 g of methyl isoamyl ketone, and 13.5 g of xylene were added to a 237 ml narrow-mouthed bottle. The resulting solution was purged with dry argon for three minutes and sealed. The sealed bottle was tumbled in a rotating water bath at 55° C. for 24 hours. The percentage of conversion was determined to be 99.1% by infrared spectrophotometric analysis. The solution contained 40% solids and had a viscosity of about 7500 cps. The inherent viscosity was determined to be about 0.72 dl/g.

Preparation of Blend

A blend of the block copolymer and acrylate ester polymer in a 1:3 weight ratio at a total solids concentration of 3.0% was prepared by dissolving 1.0 g of the block copolymer solution prepared as described above and 1.9 g of the acrylate ester polymer solution prepared as described above in 30.4 g of a solvent blend of cyclohexane, xylene, and ethanol in a weight ratio of 5.5:3.5:1.0.

EXAMPLES 2 to 9

In a like manner, blends of the block copolymer prepared as described in Example 1 and various acrylate ester polymers were prepared in a 1:3 weight ratio. The identities of the acrylate ester polymers are set forth in Table 1, below.

TABLE I

| Example | Polymer Composition |
|---|---|
| 2 | IOA/NVC/AA (93/5/2) |
| 3 | IOA/NVC/AA (88/10/2) |
| 4 | IOA/ACM (95/5)[1] |
| 5 | IOA/NVC (95/5) |
| 6 | IOA/NVC (90/10) |
| 7 | IOA/NVC (80/20) |

TABLE I-continued

| Example | Polymer Composition |
|---|---|
| 8 | IOA/NVP/AA/ACM/PSM (71/20/1/1/7)[2] |
| 9 | IOA/DMACM/AA (78/20/2)[3] |

[1]ACM is acrylamide
[2]NVP is N-vinylpyrrolidone PSM is 2-polystyrylethyl methacrylate (weight average molecular weight about 10,000 g/mol, prepared according to U.S. Pat. No. 4,554,324; 52% solids in cyclohexane.
[3]DMACM is N,N-dimethylacrylamide.

The blends prepared according to Examples 1–9 were applied by brush to 152 mm×51 mm×5 mm plaques of low density polyethylene (LDPE), polypropylene (PP)(available from Precision Punch and Plastics, Minneapolis, Minn.), and a thermoplastic polyolefin (TPO) (available from Himont USA, Inc., Lansing, Mich., under the trade designation of "ETA 3163"). After 10 minutes, aluminum foil-laminated foam pressure sensitive adhesive tape samples (1 mm thick acrylic pressure sensitive adhesive foam tapes available from Minnesota Mining and Manufacturing Company, St. Paul, Minn., under the trade designation "VHB-4205") were bonded to the primed areas as described in the test method for 90° peel adhesion. After one hour, 90° peel values were determined; the values are reported in Table II as an average of three measurements. Control peel values were also determined for unprimed plaques. The results are shown in Table II.

COMPARATIVE EXAMPLE A

A blend was prepared according to Example 1 except that IOA/AA copolymer (95/5) was substituted for the IOA/NVC/AA copolymer. 90° peel values were determined as described above; the results are reported in Table II under the designation "Comp. Ex. A."

TABLE II

| | 90° Peel Values (N/100 mm) | | |
|---|---|---|---|
| Example | LDPE | PP | TPO |
| Control | 26.0 | 26.0 | 17.5 |
| Ex. 1 | 158.0 | 281.0 | 316.0 |
| Ex. 2 | 157.0 | 158.0 | 105.0 |
| Ex. 3 | 158.0 | 298.0 | 316.0 |
| Ex. 4 | 123.0 | 281.0 | 210.5 |
| Ex. 5 | 88.0 | 88.0 | 70.0 |
| Ex. 6 | 175.4 | 263.0 | 333.0 |
| Ex. 7 | 176.0 | 351.0 | 474.0 |
| Ex. 8 | 140.0 | 263.0 | 526.0 |
| Ex. 9 | 105.0 | 316.0 | 246.0 |
| Comp. Ex. A | 88.0 | 88.0 | 70.0 |

The results in Table II demonstrate that using blends according to the invention to prime low energy surfaces improves the adhesion of pressure sensitive adhesives to the surfaces.

EXAMPLE 10

The block copolymer solution prepared according to Example 1 and the acrylate ester polymer prepared according to Example 8 were each diluted to 3% polymer solids using a solvent blend of cyclohexane, xylene, and ethanol in a weight ratio of 5.5:3.5:1.0, and applied by brush to polypropylene (PP) and low density polyethylene (LDPE) test plaques as described above. Peel values were determined as described above and compared to the values for the block copolymer/acrylate ester polymer blend prepared according to Example 8 and reported in Table II. The results are shown in Table III.

TABLE III

| | 90° Peel Values (N/100 mm) | |
| --- | --- | --- |
| | LDPE | PP |
| Block Copolymer | 35.0 | 35.0 |
| Acrylate Ester Polymer | 24.0 | 70.0 |
| Example 8 Blend | 140.0 | 263.0 |

The results in Table III demonstrate that while the individual blend components, when used alone, do not perform well as primers, high peel adhesions are obtained when they are blended together.

EXAMPLE 11

Blends containing the block copolymer prepared as in Example 1 and the acrylate ester polymer of Example 8 were prepared in weight ratios of 1:3, 1:1, and 3:1, diluted to 3% polymer solids, and brushed on test plaques of thermoplastic olefin (TPO) as described above. Peel values were determined using VHB-4205 tape as described in Example 1; the results are shown in Table IV.

TABLE IV

| Blend Ratio | 90° Peel (N/100 mm) |
| --- | --- |
| 1:3 | 518 |
| 1:1 | 171 |
| 3:1 | 186 |

The results in Table IV demonstrate that a wide variety of block copolymer/acrylate ester polymer ratios yield effective primer compositions for low energy surfaces.

EXAMPLE 12

The blend prepared according to Example 8 was applied to polypropylene (PP) and low density polyethylene (LDPE) test plaques using a lint-free tissue. After 10 minutes, aluminum foil-laminated foam tapes were bonded to the primed substrates. The foam tapes used were double coated acrylic pressure sensitive adhesive foam tape (available from Minnesota Mining and Manufacturing Company, St. Paul, Minn. under the trade designation "VHB-4205"), 1 mm thick acrylic transfer pressure sensitive adhesive tape (available from Minnesota Mining and Manufacturing Company, St. Paul, Minn. under the trade designation "VHB-4910"), and double coated styrene-butadiene rubber pressure sensitive adhesive foam tape (available from Minnesota Mining and Manufacturing Company, St. Paul, Minn. under the trade designation "VHB-4952"). After one hour, 90° peel values were determined; values for unprimed substrates were determined as well. The results are reported in Table V.

TABLE V

| | 90° Peel Values (N/100 mm) | |
| --- | --- | --- |
| | PP | LDPE |
| Unprimed | | |
| "VHB-4205" | 26.0 | 26.0 |
| "VHB-4910" | 52.0 | 26.0 |
| "VHB-4952" | 298.0 | 210.0 |
| Primed | | |
| "VHB-4205" | 350.0 | 561.0 |

TABLE V-continued

| | 90° Peel Values (N/100 mm) | |
| --- | --- | --- |
| | PP | LDPE |
| "VHB-4910" | 228.0 | 315.0 |
| "VHB-4952" | 491.0 | 666.0 |

The results in Table V demonstrate that the use of a blend according to the invention as a primer improves the peel adhesion of both acrylic and styrene butadiene rubber (SBR) pressure sensitive adhesives to low energy surfaces.

EXAMPLE 13

About 109 g of a 3% primer solution prepared according to Example 8 was modified by the addition of 0.5 g of epoxy resin (available from Shell Chemical Company, Houston, Tex., under the trade designation "Epon 828"), 3.0 g of chlorinated polypropylene (available from Eastman Chemical Company, Kingsport, Tenn., under the trade designation "CP 343-3"), 0.5 g of silane coupling agent (available from OSi Specialties, Inc., Danbury, Conn., under the trade designation "Silquest A 186") and 0.8 g of triethanolamine titanate (available from E.I. du Pont de Nemours & Company, Wilmington, Del., under the trade designation "Tyzor TE"). About 25 g of this solution was diluted to 1% solids by the addition of 109 g of a solvent mixture of cyclohexane, xylene, and ethanol in a weight ratio of 5.5:3.5:1.0. The primer solution was brushed on test plaques of glass, aluminum (Al), and stainless steel (S.S.). After 10 minutes, aluminum foil-laminated tapes ("VHB-4205", "VHB-4910", and "VHB-4952") were bonded to the primed samples. After 72 hours, 90° peel values were determined; the results are recorded in Table VI.

COMPARATIVE EXAMPLE B

The procedure of Example 13 was followed except that the glass, aluminum, and stainless steel test plaques were primed with a commercially available chlorinated polypropylene primer (available from Norton Performance Plastics, Granville, N.Y., under the trade designation "Tite-R-Bond-2684"). The results are shown in Table VI.

TABLE VI

| | 90° Peel Values (N/100 mm) | | |
| --- | --- | --- | --- |
| Primer Solution | Glass | Al | S.S. |
| Unprimed | | | |
| "VHB-4205" | 386 | 684 | 315 |
| "VHB-4910" | 263 | 140 | 210 |
| "VHB-4952" | 386 | 386 | 351 |
| Example 13 | | | |
| "VHB-4205" | 702 | 702 | 263 |
| "VHB-4910" | 561 | 351 | 263 |
| "VHB-4952" | 561 | 631 | 526 |
| Comparative Example B | | | |
| "VHB-4205" | 32 | 351 | 35 |
| "VHB-4910" | 26 | 351 | 17 |
| "VHB-4952" | 456 | 491 | 26 |

Table VI demonstrates that the primer solution of this invention improves the adhesion of both acrylic and styrene butadiene rubber (SBR) pressure sensitive adhesives to substrates of high surface energy (e.g., glass, stainless steel, and aluminum).

EXAMPLE 14

A 1% primer solution prepared according to Example 13 was applied to low density polyethylene (LDPE) and polypropylene (PP) test plaques with a lintless tissue (available from Kimberly-Clark Corp., Roswell, Ga., under the trade designation "Kimwipe"). After 10 minutes, aluminum foil-laminated foam tapes (available from Minnesota Mining and Manufacturing Company, St. Paul, Minn. under the trade designations "VHB-4 205", "VHB-4910", and "VHB-4952") were bonded to the primed samples. After one hour, the peel values were determined. The values are reported in Table VII.

COMPARATIVE EXAMPLE C

The procedure of Example 14 was followed except that the LDPE and PP test plaques were primed with a formulated chlorinated polypropylene primer. The results are reported in Table VII.

TABLE VII

| Primer Solution | 90° Peel Values (N/100 mm) | |
| --- | --- | --- |
|  | LDPE | PP |
| Unprimed |  |  |
| "VHB-4205" | 26 | 26 |
| "VHB-4910" | 26 | 52 |
| "VHB-4952" | 210 | 298 |
| Example 14 |  |  |
| "VHB-4205" | 737 | 702 |
| "VHB-4910" | 596 | 386 |
| "VHB-4952" | 667 | 526 |
| Comparative Example C |  |  |
| "VHB-4905" | 298 | 473 |
| "VHB-4910" | 140 | 351 |
| "VHB-4952" | 351 | 403 |

The results shown in Table VII demonstrate that the primer of Example 14 results in higher peel values with both acrylic and SBR pressure sensitive adhesives to low energy surface substrates compared to the chlorinated polyolefin primer of Comparative Example C.

EXAMPLE 15

A 1% primer solution prepared according to Example 13 was brushed on 75 mm×125 mm×0.25 mm specimens of linear low density polyethylene film (LLDPE) (available from Consolidated Thermoplastics Company, Schaumburg, Ill.). After 15 minutes, aluminum foil-laminated samples of "VHB-4220" tape were bonded to the primed samples. After one hour, the "VHB-4220" tape could not be removed due to the cohesive failure of the foam core. This indicated that peel values of at least 425 N/100 mm had been achieved.

COMPARATIVE EXAMPLE D

The procedure of Example 15 was followed except that a formulated chlorinated polypropylene primer (available from Norton Performance Plastics, Granville, N.Y., under the trade designation "Tite-R-Bond 2684") was brushed on the LLDPE specimens. After 15 minutes, "VHB-4220" tape was bonded to the Samples. After one hour and after twelve hours, the tape could easily be removed by hand. Peel values were estimated to be on the order of about 90 N/100 mm or less.

EXAMPLE 16

A 1% primer solution prepared according to Example 13 was brushed on two 125 mm×75 mm×0.25 mm specimens of linear low density polyethylene film (LLDPE) (available from Consolidated Thermoplastics Company, Schaumburg, Ill.). The primed specimens were then allowed to dry for 15 minutes and 24 hours, respectively. Next, the primed samples were painted with a latex semi-gloss interior enamel (available from The Glidden Company, Cleveland, Ohio), an interior/exterior oil-based high gloss enamel (available from Carver Tripp, Parks Corp. Somerset, Mass.), and an aerosol polyurethane lacquer (available from Minnesota Mining and Manufacturing Company, St. Paul, Minn., under the trade designation "Part NO-05904"). In a like manner, unprimed specimens of LLDPE film were also painted. After drying under ambient conditions for 24 hours, 125 mm×75 mm×0.25 mm samples of filament tape (available from Minnesota Mining and Manufacturing Company, St. Paul, Minn., under the trade designation "Scotch Brand 898") were firmly bonded to each painted surface (primed and unprimed). After 15 minutes, the tape was quickly removed from each specimen. Complete delamination of all paints to the unprimed LLDPE films was observed. No delamination of paint was observed from any of the primed LLDPE surfaces.

COMPARATIVE EXAMPLE E

The procedure of Example 16 was followed except that a commercially available chlorinated polypropylene primer (available from Norton Performance Plastics, Granville, N.Y., under the trade designation "Tite-R-Bond 2684") was brushed on LLDPE specimens. The primed specimens were painted and tested as described in Example 16. Complete delamination of all paints to the primed film was observed.

EXAMPLE 17

To 10 g of a 3% primer solution prepared according to Example 13 was added 1 g of titanium dioxide dispersion (available from Hüls America Inc., Piscataway, N.J., under the trade designation "GPD 82-0082"). Likewise, to another 10 g of the same primer solution was added 1 g of carbon black dispersion (available from Borden Chemical Company, Cincinnati, Ohio, under the trade designation "Codispersion 31L62"). After mixing, both pigmented solutions were brushed on untreated LLDPE film and allowed to dry under at ambient conditions for 24 hours. The peel adhesions of the pigmented coatings to LLDPE film was determined by firmly bonding filament tape (available from Minnesota Mining and Manufacturing Company, St. Paul, Minn., under the trade designation "Scotch Brand 898") to the coated surfaces in the manner previously described in Example 16. No delamination of either coating was observed when the tape was rapidly removed.

This example demonstrates that compositions according to the invention can be utilized to prepare coatings, inks, and paints that adhere well to low energy polymer surfaces.

EXAMPLE 18

A 1% primer solution prepared according to Example 13 was brushed on 50.8 mm×24.4 mm×5.1 mm test plaques of thermoplastic olefin (TPO), (commercially available from Himont USA Inc., Lansing, Mich., under the trade designation "ETA 3163") and tested for static shear to FPL etched 2024-T3 aluminum at 80° C. under a 1.0 kg load utilizing foam tape (available from Minnesota Mining and Manufacturing Company, St. Paul, Minn., under the trade designation "VHB-4210"). Unprimed thermoplastic olefin (TPO) specimens were also tested. The results are reported in Table VIII.

TABLE VIII

| Primer | Static Shear Value (min.) |
|---|---|
| Control | 300 |
| Example 13 | 6,000+ |

The results in Table VIII demonstrate that the primer solutions of the invention improve the high temperature holding power of an acrylic pressure sensitive adhesive to substrates of low surface energy.

EXAMPLE 19

A 3% primer solution prepared according to Example 13 was brushed on both sides of a 150 mm×150 mm×0.10 mm specimen of clear, flexible polyvinyl chloride (PVC) film (available from Wiman Plastic Div., St. Cloud, Minnesota, Minn.) and a 150 mm×150 mm×0.35 mm specimen of unpigmented, opaque thermoplastic olefin (TPO) film (available from Himont USA Inc., Lansing, Mich., under the trade designation "HIFAX CA10A") and allowed to dry for 30 minutes. A 0.25 mm acrylic pressure sensitive transfer adhesive carried on a removable liner (available from Minnesota Mining and Manufacturing Company, St. Paul, Minn., under the trade designation "F 9473 PC") was laminated to one side of each of the films with a 2.4 kg hard-rubber roller. Likewise, 126 mm×12.5 mm of the same adhesive was laminated to 130 mm×15.9 mm×0.13 mm strips of aluminum foil with a 2.4 kg hard-rubber roller.

The peel values of the transfer adhesive to the primed tape backings were then determined by laminating a 150 mm×51 mm sample of each transfer tape/backing construction to 152 mm×51 mm×1.6 mm FPL etched aluminum plates (available from Vincent Metals, Minneapolis, Minn. under the trade designation "2024-T3") with a 2.4 kg rubber roller. About 75 mm of liner was removed from the aluminum foil-laminated transfer adhesive samples and bonded to each of the tape samples on the aluminum plate in a manner such that two test samples for each tape were prepared. The resulting samples had the following construction: aluminum plate/transfer adhesive/primed backing (both sides)/transfer adhesive/aluminum foil. Unprimed control samples were prepared in a similar manner. The peel values are reported in Table IX.

TABLE IX

| | Peel Values (N/100 mm) |
|---|---|
| Unprimed | |
| PVC | 175 |
| TPO | 7 |
| Primed | |
| PVC | 702* |
| TPO | 702* |

*adhesive and film failure.

This example illustrates that pressure sensitive adhesive tapes having holding power to backing equivalent to the cohesive strength of the adhesive or the tensile or yield strength of the backing can be prepared.

EXAMPLE 20

Plaques measuring 51 mm×25.4 mm×5 mm of polypropylene (PP) and high density polyethylene (HDPE) (available from Precision Punch & Plastics, Minneapolis, Minn.) were cleaned with heptane and rinsed with ethanol. After 15 minutes a 1% primer solution prepared according to Example 13 was applied to one side of each of the plaques using a cotton-tipped applicator. The primed plaques were then bonded together (i.e., HDPE plaques were bonded to HDPE plaques and PP plaques were bonded to PP plaques) with an ethyl cyanoacrylate adhesive and the overlap joint strengths determined. The results are reported in Table X.

TABLE X

| Substrate | Overlap Joint Strength (N/mm$^2$) |
|---|---|
| HDPE | 2.0 |
| PP | 6.1 |

This example illustrates that the primer solutions of the invention initiate the polymerization of ethyl cyanoacrylate adhesives to give high bond strengths between substrates of low surface energy.

EXAMPLE 21

Example 21 involved a construction using a thermosetting adhesive and was prepared as described under the 90° Peel Adhesion—Thermosetting Adhesive test method. The solution used is set forth in Table XI:

TABLE XI

| Component | Amount (g) |
|---|---|
| solvent mixture of cyclohexane, xylene, and ethanol in a weight ratio of 5.5:3.5:10 | 30 |
| styrene block copolymer (available from Shell Chemical Company, Houston, TX under the trade designation "G-1657") | 0.23 |
| chlorinated polypropylene (available from Eastman Chemical Company, Kingsport, TN under the trade designation "CP 343-3") | 0.92 |
| epoxy resin (available from Shell Chemical Company, Houston, TX, under the trade designation "Epon 828") | 0.15 |
| epoxy silane coupling agent (available from OSi Specialties Inc., Danbury, CT, under the trade designation "Silquest A 186") | 0.15 |
| iso-octyl acrylate/N-vinylcaprolactam polymer of Example 7 in a weight ratio of 80:20 (40% solids) | 1.8 |
| triethanolamine titanate (available from E.I. du Pont de Nemours & Company, Wilmington, DE, under the trade designation "Tyzor TE") | 0.07 |

The surface of the sample was initially flooded with about 1.5 ml of the 5% solution and abraded according to the test method described above. The control sample was prepared by abrading the sample in the absence of a primer solution. The results are set forth in Table XII.

TABLE XII

| | 90° Peel Values (N/100 mm) | |
|---|---|---|
| Solution | LDPE | PP |
| Control | 17.5 | 14.0 |
| Example 21 | 151.0 | 296.0 |

The 90° peel values were dramatically increased by using a solution in accordance with the present invention as compared to an unprimed substrate.

EXAMPLE 22

Thermoplastic polyolefin plaques, 51 mm×25.4 mm×5 mm, (available from Himont USA, Inc., Lansing, Mich., under the trade designation "ETA 3163") were cleaned twice with ethanol and allowed to dry. A 5% solution prepared according to Example 21 was brushed on one side of each of the plaques and allowed to dry for 24 hours.

The primed plaques were bonded with two-part epoxy adhesives (available from Minnesota Mining and Manufacturing Company, St. Paul, Minn., under the trade designation "Scotch-Weld 2216 B/A") to form 25.4 mm×12.7 mm overlap joint. The samples were allowed to cure for 72 hours under a weight of 150 g. Additionally, control samples were run three times without using any primer solution. Joint strengths (N/mm$^2$) were measured in an Instron tensile tester (available from Instron Corp., Canton, Mass.) at a crosshead speed of 12.7 mm per minute. The values reported in Table XIII are an average of three determinations.

TABLE XII

| Solution | Overlap Joint Strength (N/mm$^2$) TPO |
| --- | --- |
| Control | 0.34 |
| Example 22 | 1.03 |

What is claimed is:

1. A method of priming a substrate comprising applying to the substrate a blend comprising
   (a) a block copolymer comprising
      (i) a polystyrene block and
      (ii) a polydiene block or a hydrogenated polydiene block, said block copolymer (a) being non-maleated; and
   (b) a polymer comprising a polymerization reaction product of
      (i) at least one acrylic or methacrylic acid ester of a non-tertiary alcohol having 1 to 14 carbon atoms, inclusive,
      (ii) at least one nitrogen-containing monomer selected from the group consisting of an N-vinyllactam and an N,N-dialkylacrylamide, and
      (iii) from 1–10 parts, based upon 100 parts of polymer (b), of a monomer having at least one of carboxylic acid functionality, hydroxy functionality or epoxy functionality.

2. The method of claim 1 wherein a homopolymer of said ester has a Tg less than 20° C.

3. The method of claim 1 wherein said ester comprises iso-octyl acrylate.

4. The method of claim 1 wherein said nitrogen-containing monomer comprises N-vinylcaprolactam.

5. The method of claim 1 wherein said nitrogen-containing monomer comprises N,N-dimethylacrylamide.

6. The method of claim 1 wherein a polymeric moiety capable of associating with one or more of the blocks of said block copolymer (a) is polymerized with said acrylic or methacrylic acid ester of said polymer (b), said polymeric moiety having a Tg greater than 20° C. and a weight average molecular weight above 2,000.

7. The method of claim 1 wherein said polymer (b) further comprises a polar monomer comprising acrylic acid, methacrylic acid, or itaconic acid.

8. The method of claim 1 wherein said polymer (b) comprises at least 5 parts by weight of said nitrogen-containing monomer based upon 100 parts of polymer (b).

9. The method of claim 1 wherein said polymer (b) comprises 10 to 40 parts by weight of said nitrogen-containing monomer based upon 100 parts of polymer (b).

10. The method of claim 1 wherein said polymer (b) comprises 15 to 30 parts by weight of said nitrogen-containing monomer based upon 100 pads of polymer (b).

11. The method of claim 1 wherein said N-vinyllactam is present in an amount of 5 parts or more, based upon 100 parts of polymer (b).

12. The method of claim 11 wherein said monomer (iii) is selected from the group consisting of acrylic acid, methacrylic acid, itaconic acid, 2-hydroxyethyl acrylate, 2-hydroxyethyl methacrylate, glycidyl acrylate, and glycidyl methacrylate.

13. The method of claim 1 wherein said blend comprises styrene-ethylene/butylene-styrene block copolymer and iso-octyl acrylate/N-vinylcaprolactam/acrylic acid polymer.

14. The method of claim 1 wherein said blend comprises styrene-ethylene/butylene-styrene block copolymer and iso-octyl acrylate/N-vinylcaprolactam/acrylic acid polymer.

15. The method of claim 1 wherein said blend comprises styrene-ethylene/butylene-styrene block copolymer and iso-octyl acrylate/N,N-dimethylacrylamide/acrylic acid polymer.

16. The method of claim 1 wherein said block copolymer (a) is present in an amount sufficient to associate with the substrate.

17. The method of claim 1 wherein said polymer (b) is present in an amount sufficient to bond to said block copolymer (a).

18. The method of claim 1 wherein said block copolymer (a) and said polymer (b) are present in a weight ratio ranging from about 95:5 to about 5:95.

19. The method of claim 1 wherein of said block copolymer (a) and said polymer (b) are present in a weight ratio ranging from about 75:25 to about 25:75.

20. The method of claim 1 wherein said substrate is a low energy substrate.

21. A polymer blend comprising
   (a) a block copolymer, in an amount sufficient to associate with a substrate, comprising (i) a polystyrene block; and (ii) a polydiene block or a hydrogenated polydiene block, said block copolymer (a) being non-maleated, and
   (b) a polymer, in an amount sufficient to bond to block copolymer (a), comprising a polymerization reaction product of
      (i) at least one mono-ethylenically unsaturated acrylic or methacrylic acid ester of a non-tertiary alcohol having 1 to 14 carbon atoms, inclusive;
      (ii) at least one mono-ethylenically unsaturated nitrogen-containing monomer selected from the group consisting of an N-vinyllactam and N,N-dialkylacrylamide; and
      (iii) from 1–10 parts, based upon 100 parts of polymer (b), of a monomer having at least one of carboxylic acid functionality, hydroxy functionality or epoxy functionality.

22. The blend of claim 21 wherein said monomer (iii) is selected from the group consisting of acrylic acid, methacrylic acid, itaconic acid, 2-hydroxyethyl acrylate, 2-hydroxyethyl methacrylate, glycidyl acrylate, and glycidyl methacrylate.

23. The blend of claim 21 wherein said blend comprises styrene-ethylene/butylene-styrene block copolymer and isooctyl acrylate/N-vinylcaprolactam/acrylic acid polymer.

24. The blend of claim 21 wherein said blend comprises styrene-ethylene/butylene-styrene block copolymer and isooctyl acrylate/N,N-dimethylacrylamide/acrylic acid polymer.

25. The blend of claim 21 wherein said polymer (b) comprises at least 5 parts by weight of said nitrogen-containing monomer based upon 100 parts of polymer (b).

26. The blend of claim 21 wherein said polymer (b) comprises 10 to 40 parts by weight of said nitrogen-containing monomer based upon 100 pads of polymer (b).

27. The blend of claim 21 wherein said polymer (b) comprises 15 to 30 parts by weight of said nitrogen-containing monomer based upon 100 parts of polymer (b).

* * * * *